Oct. 11, 1960      L. LEITZ      2,955,507
FOCUSSING PLATE FOR OPTICAL INSTRUMENTS
Filed Feb. 16, 1959

INVENTOR
Ludwig Leitz
BY Benj. T. Rauber
his Attorney

United States Patent Office 2,955,507
Patented Oct. 11, 1960

2,955,507

FOCUSSING PLATE FOR OPTICAL INSTRUMENTS

Ludwig Leitz, Wetzlar (Lahn), Germany, assignor to Ernst Leitz, G.m.b.H., Wetzlar (Lahn), Germany, a corporation of Germany Filed Feb. 16, 1959, Ser. No. 793,381

3 Claims. (Cl. 88—1)

My invention relates to a focussing plate for optical instruments. This application is a continuation-in-part of my co-pending application Serial No. 510,837, filed May 24, 1955, now abandoned, which application is based on German patent application No. L 18 927 IXa/57a, filed in Germany May 25, 1954.

In optical instruments, as for example, in photographic cameras, view finders and microscope cameras, a granulated or ground glass serves for sharp focussing. It is known that a rough grain of the ground glass diminishes the precision of focussing and that, on the other hand, a very fine grain is not efficient in diffusing the light so that the image is visible only in the center of the field of vision.

It is a known compromise, for example, as described in Patents 983,047 and 2,286,977 that a part of the ground glass is polished or at least of a finer grain. So the plate contains a clear and transparent part—mostly in the center—where the image formed by the objective remains undisturbed by the grain of the ground glass. This clear part contains a cross-hair or a mark on the same side as the ground surface of the plate, facilitating the focussing of the air scape in the plane of the ground glass. The outer parts are translucent and diffuse the light sufficiently for viewing the field of vision up to its edge.

In this known arrangement the brightness of the two parts is very different. Either the glare in the transparent part is so high that focussing becomes difficult or, if this is avoided by lowering the brightness of the microscope lamp, the image on the ground part is no longer perceptible.

A similar ground glass plate is described in German Patent 740,327. In this patent several zones of different grain are provided. The glass may be used for various sizes or formats. The image boundaries for the different sizes are identified by different colorings. In this ground plate halation occurs in the fine grain places, for at these places the light will be but slightly scattered and passes thus through the plate almost as a clear glass.

My invention relates to an arrangement which makes equally possible the sharp focussing and at the same time the viewing of the image up to the edges of the ground glass of the plate. It provides a focussing plate for optical instruments with transparent and translucent parts characterized in that the transparent part consists of a glass that is at least 20% more light absorbing than the glass of the translucent part. The transparent part may be made of a light absorbing glass or by covering a glass by a light absorbing layer. The transparence of the clear transparent part equals the transparence of the light diffusing ground part.

Features of my invention are illustrated in the accompanying drawings, in which.

Figure 1:
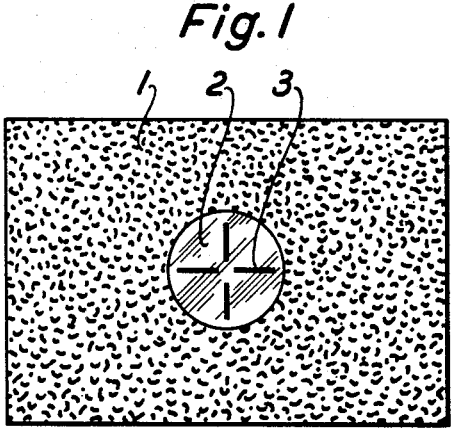
Fig. 1 illustrates a focussing plate embodying an example of the invention.

As shown in Fig. 1 a mat or ground glass plate 1 is provided with a central, transparent, light absorbing part 2 on which is inscribed a focussing mark 3 for sharp focussing.

Figure 2:
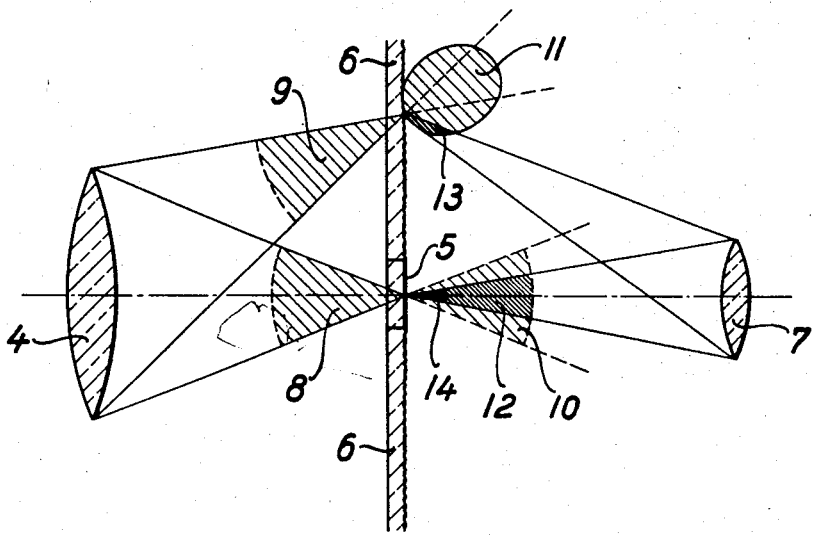
Fig. 2 is a diagrammatic sketch illustrating the light proportions in the transparent and translucent parts of the focussing plate.

As shown in the diagram of Fig. 2 a lens 4 projects an image on the focussing plate which consists of the transparent part 5 and the translucent part 6 and which will be observed through the ocular or lens 7. The brightness observed by the viewer of the several image points of the image projected on the focussing plate is dependent on the aperture of the lens 4, on the aperture of the viewing lens 7, on the position of the viewing lens 7 to the focussing plate 5, 6 and on the light transmitting and light diffusing parts of the focussing plate.

According to the illustration of Fig. 2 the optical axes of the lenses 4 and 7 co-incide. The sector 8 of a circle represents a measure for the light stream of a group of rays which forms an image point on the transparent part 5 of the focussing plate. The angle of opening of the incident group of rays is equally illustrated by the sector 8 for an axial image point. What the circle sector 8 indicates for an axial image point, the circle sector 9 indicates for an image point away from the optical axis. The rays passing through the transparent part 5 of the focussing plate are not diffused, that is, the group of rays characterized by 8 passes out of the transparent part 5 of the focussing plate as the group of rays 10. The angle of opening of the rays 10 is thereby not changed and equally the light stream aside from the reflection and absorption losses of the transparent part 5. The group of rays indicated by the circle sector 9 which strike the translucent part 6 are diffused thereby. The diffuse characteristic 11 of the exit rays which is dependent on the grain size and manner of formation of the translucent part 6 of the focussing plate contains the same light stream, when summated over all directions, as the ray group falling on the focussing plate and designated by the circle sector 9, aside from reflection and absorption losses.

But all rays of the group which are characterized by the sector 10 and by the diffused characteristic 11 are not received by the ocular lens 7 but only the rays which correspond with the shaded sector 12 of the circle sector 10 and with the shaded sector 13 of the diffusion characteristic 11. Since the areas of the sectors 12 and 13 form a measure from the light stream reaching the eye lens 7, it is apparent that the light streams which arrive from the transparent and from the translucent areas of the focussing plate are very greatly different, that is, that the eye will be blinded by the light represented by the sector 12 when the light represented by the area 13 is sufficiently bright for focussing. Blinding of the eye is avoided when the transparent part 5 of the focussing plate is made at least 20% more light absorbing than the glass of the translucent area 6. Accordingly the absorption of this part must be so strong that the light stream coming from the part 5 is about equal to the light stream which comes from an out of the axis part, that is, from the translucent place on the focussing plate. This is indicated in Fig. 2 by the black sector 14, which is about equal in area to the sector 13.

It is thus apparent that the area 2 may be polished to the smoothness of surfaces as commonly used in optics with no significant diffusion and that the glass of the matt or ground part of the plate may be of a quality having no appreciable absorption of rays in the visible spectrum. The absorption in the area 2 is such that the light coming therethrough about equals that coming to the eye lens although precision in this equalizing is not strictly necessary but desirable for the best results.

Having described my invention, I claim:

1. A light transmitting focussing plate for optical instruments having a transparent central area and a translucent matt surface about said central area said central transparent area having light absorption properties in the visible spectrum absorbing about 20% more than the glass of the matt surface about said central area, and the absorption being such that said central area equalizes approximately the amount of light reaching an observer from a light point in said central area and from a light point in said matt surface about said central area.

2. The focussing plate of claim 1 in which the light absorption in the central area is obtained by glass in this area of greater light absorption than the glass in the matt surface area.

3. The focussing plate of claim 1 in which the light absorption in the central area is obtained by covering the glass in this area with a light absorbing covering.

References Cited in the file of this patent

UNITED STATES PATENTS

| | | |
|---|---|---|
| 983,047 | Grant | Jan. 31, 1911 |
| 1,986,522 | Owens | Jan. 1, 1935 |
| 2,553,108 | Osterberg et al. | May 15, 1951 |
| 2,881,686 | Ruhle | Apr. 14, 1959 |

FOREIGN PATENTS

| | | |
|---|---|---|
| 740,327 | Germany | Oct. 16, 1943 |